United States Patent
Bittner, Jr. et al.

(10) Patent No.: US 10,140,572 B2
(45) Date of Patent: Nov. 27, 2018

(54) MEMORY BANDWIDTH MANAGEMENT FOR DEEP LEARNING APPLICATIONS

(71) Applicant: Microsoft Technology Licensing, LLC, Redmond, WA (US)

(72) Inventors: Ray A. Bittner, Jr., Snohomish, WA (US); Frank Torsten Bernd Seide, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 554 days.

(21) Appl. No.: 14/750,277

(22) Filed: Jun. 25, 2015

(65) Prior Publication Data
US 2016/0379111 A1    Dec. 29, 2016

(51) Int. Cl.
| | | |
|---|---|---|
| *G06N 3/063* | (2006.01) | |
| *G06N 3/08* | (2006.01) | |
| *G06F 9/38* | (2018.01) | |
| *G06N 3/04* | (2006.01) | |
| *G10L 15/16* | (2006.01) | |

(52) U.S. Cl.
CPC .............. *G06N 3/08* (2013.01); *G06F 9/3885* (2013.01); *G06N 3/04* (2013.01); *G06N 3/0445* (2013.01); *G06N 3/063* (2013.01); *G10L 15/16* (2013.01)

(58) Field of Classification Search
CPC ....................................................... G06N 3/063
See application file for complete search history.

(56) References Cited

U.S. PATENT DOCUMENTS

| | | |
|---|---|---|
| 8,352,265 B1 | 1/2013 | Lin et al. |
| 8,463,610 B1 | 6/2013 | Bourke et al. |
| 8,639,510 B1 | 1/2014 | Yu et al. |
| 2008/0262827 A1 | 10/2008 | Degroot et al. |
| 2009/0043818 A1 | 2/2009 | Raichelgauz et al. |
| 2014/0142929 A1 | 5/2014 | Seide et al. |

(Continued)

FOREIGN PATENT DOCUMENTS

| | | |
|---|---|---|
| WO | 2012106429 A1 | 8/2012 |
| WO | 2014040003 A1 | 3/2014 |

OTHER PUBLICATIONS

Maeda, et al., Simultaneous Perturbation Learning Rule for Recurrent Neural Networks and Its FPGA Implementation, IEEE Transactions on Neural Networks, vol. 16, No. 6, Nov. 2005, pp. 1664-1672.*

(Continued)

*Primary Examiner* — Wilbert L Starks
(74) *Attorney, Agent, or Firm* — Talem IP Law, LLP

(57) ABSTRACT

In a data center, neural network evaluations can be included for services involving image or speech recognition by using a field programmable gate array (FPGA) or other parallel processor. The memory bandwidth limitations of providing weighted data sets from an external memory to the FPGA (or other parallel processor) can be managed by queuing up input data from the plurality of cores executing the services at the FPGA (or other parallel processor) in batches of at least two feature vectors. The at least two feature vectors can be at least two observation vectors from a same data stream or from different data streams. The FPGA (or other parallel processor) can then act on the batch of data for each loading of the weighted datasets.

20 Claims, 6 Drawing Sheets

(56) References Cited

U.S. PATENT DOCUMENTS

2014/0289445 A1 9/2014 Savich

OTHER PUBLICATIONS

Choubassi, et al., Arabic Speech Recognition Using Recurrent Neural Networks, Proceedings of the 3rd IEEE International Symposium on Signal Processing and Information Technology, ISSPIT 2003, 2003, pp. 543-547.*
Shafiee, et al., ISAAC: A Convolutional Neural Network Accelerator with In-Situ Analog Arithmetic in Crossbars, ISCA '16 Proceedings of the 43rd International Symposium on Computer Architecture, 2016, pp. 14-26 (Year: 2016).*
"International Search Report and Written Opinion Issued in PCT Application No. PCT/US2016/038836", dated Oct. 13, 2016, 13 Pages.
Kim, et al., "A Fully Pipelined FPGA Architecture of a Factored Restricted Boltzmann Machine Artificial Neural Network", In the ACM Transactions on Reconfigurable Technology and Systems, vol. 7, Issue 1, Feb. 1, 2014, 23 Pages.
Moreau, et al., "SNNAP: Approximate Computing on Programmable SoCs via Neural Acceleration", In Proceedings of the 2015 IEEE 21st International Symposium on High Performance Computer Architecture, Feb. 7, 2015, pp. 603-614.
Ovtcharov, et al., "Accelerating Deep Convolutional Neural Networks Using Specialized Hardware", Retrieved from <<https://web.archive.org/web/20150318123847/http://research.microsoft.com/pubs/240715/CNN%20Whitepaper.pdf>>, Feb. 22, 2015, 4 Pages.
Chen, et al., "Improving the Training and Evaluation Efficiency of Recurrent Neural Network Language Models", In Proceedings of the 2015 IEEE International Conference on Acoustics, Speech and Signal Processing, Apr. 19, 2015, pp. 5401-5405.
Purnaprajna, et al., "Using Run-time Reconfiguration for Energy Savings in Parallel Data Processing", In Proceedings of the International Conference on Engineering of Reconfigurable Systems and Algorithms, Jul. 13, 2009, pp. 119-125.
Yan, et al., "Performance Modeling and Scalability Optimization of Distributed Deep Learning Systems", In Proceedings of the 21th ACM SIGKDD International Conference on Knowledge Discovery and Data Mining, Aug. 10, 2015, 14 Pages.
Second Written Opinion Issued in PCT Application No. PCT/US2016/038836, dated Jan. 2, 2017, 7 Pages.
Lin, et al., "A 1000-Word Vocabulary, Speaker-Independent, Continuous Live-Mode Speech Recognizer Implemented in a Single FPGA", In Proceedings of ACM/SIGDA 15th International Symposium on Field Programmable Gate Arrays, Feb. 18, 2007, 9 Pages.
Kim, et al., "X1000 Real-Time Phoneme Recognition VLSI using Feed-Forward Deep Neural Networks", In Proceedings of IEEE International Conference on Acoustic, Speech and Signal Processing, May 4, 2014, pp. 7510-7514.
Aliaga, et al., "System-on-Chip Implementation of Neural Network Training on FPGA", In International Journal on Advances in Systems and Measurements, vol. 2, No. 1, Jun. 7, 2009, pp. 44-55.
Akin, et al., "Memory Bandwidth Efficient Two-Dimensional Fast Fourier Transform Algorithm and Implementation for Large Problem Sizes", In Proceedings of IEEE 20th International Symposium on Field-Programmable Custom Computing Machines, Apr. 29, 2012, 4 Pages.
Yam, Marcus, "Google's Stunning Voice Translation App", Published on: Jan. 17, 2011 Available at: http://www.tomsguide.com/us/google-translate-android-app-translation,news-9716.html.
Gomperts, et al., "Development and Implementation of Parameterized FPGA-Based General Purpose Neural Networks for Online Applications", In Proceedings of IEEE Transactions on Industrial Informatics, vol. 7, Issue 1, Oct. 21, 2010, pp. 1-12.
Gulzar, et al., "Systematic Analysis of Automatic Speech Recognition: An Overview", in International Journal of Current Engineering and Technology, vol. 4, No. 3, Jun. 2014, pp. 1664-1675.
Atwell, Cabe, "Microsoft's Live Speech Translator, Your Voice in Other Languages", Published on: Nov. 14, 2012, 5 Pages.
Putnam, et al.; "A Reconfigurable Fabric for Accelerating Large-Scale Datacenter Services"; published in 2014 ACM/IEEE 41st International Symposium on Computer Architecture (ISCA); Jun. 14-18, 2014; 12 pages.
Zhang, et al.; "Optimizing FPGA-based Accelerator Design for Deep Convolution Neural Networks"; published in FPGA'15 Proceedings of the 2015 ACM/SIGDA International Symposium on Field-Programmable Gate Arrays; Feb. 22-24, 2015; 10 pages.

* cited by examiner

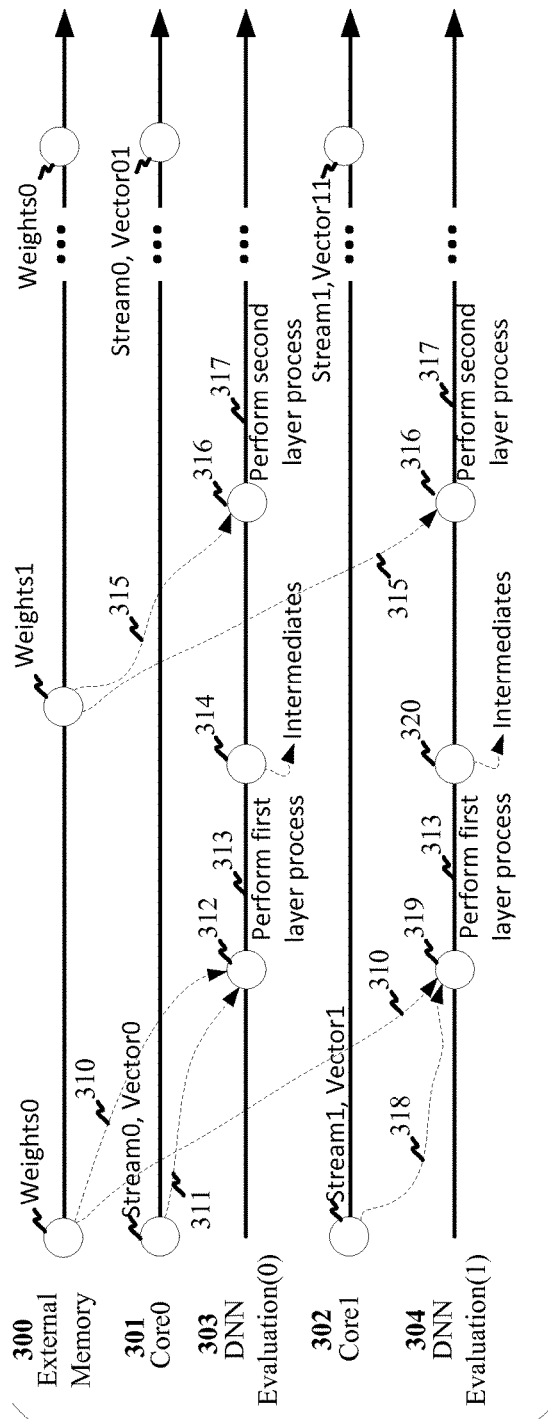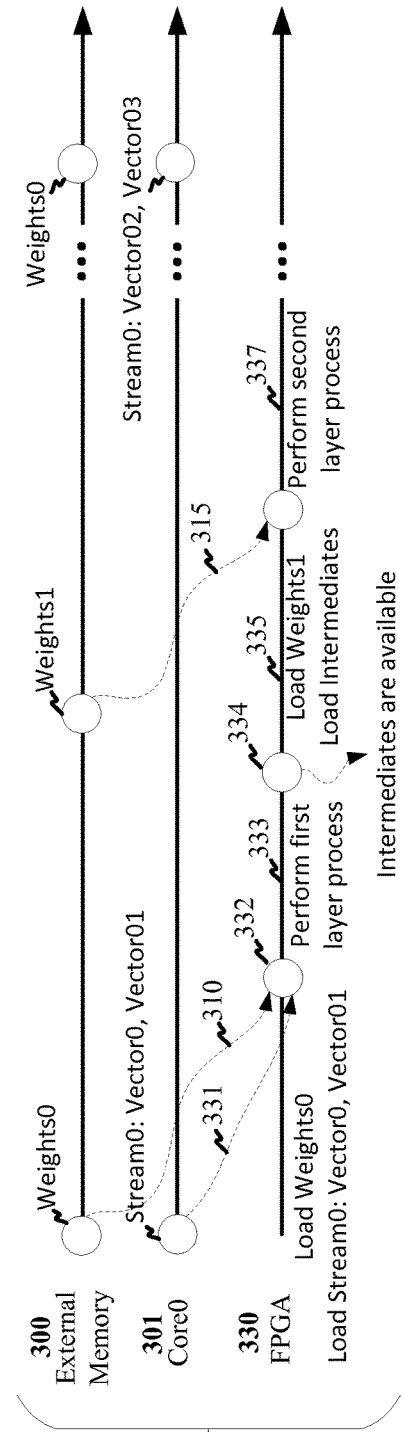
FIG. 3A
FIG. 3B

MEMORY BANDWIDTH MANAGEMENT FOR DEEP LEARNING APPLICATIONS

BACKGROUND

Artificial intelligence (AI) applications involve machines or software that are made to exhibit intelligent behavior such as learning, communication, perception, motion and manipulation, and even creativity. The machines or software can achieve this intelligent behavior through a variety of methodologies such as search and optimization, logic, probabilistic methods, statistical learning, and neural networks. Along these lines, various deep learning architectures such as deep neural networks (deep NN) including deep multi-layer perceptrons (MLPs) (often referred to as a DNN), convolutional deep neural networks, deep belief networks, recurrent neural networks (RNN), and long-short-term memory (LSTM) RNNs, have gained interest for their application to fields like computer vision, image processing/recognition, speech processing/recognition, natural language processing, audio recognition, and bioinformatics.

A deep NN generally consists of an input layer, an arbitrary number of hidden layers, and an output layer. Each layer contains a certain amount of units, which may follow the neuron model, and each unit corresponds to an element in a feature vector (such as an observation vector of an input dataset). Each unit typically uses a weighted function (e.g., a logistic function) to map its total input from the layer below to a scalar state that is sent to the layer above. The layers of the neural network are trained (usually via unsupervised machine learning) and the units of that layer assigned weights. Depending on the depth of the neural network layers, the total number of weights used in the system can be massive.

Many computer vision, image processing/recognition, speech processing/recognition, natural language processing, audio recognition, and bioinformatics are executed and managed at data centers supporting services available to large numbers of consumer and enterprise clients. Data centers are designed to run and operate computer systems (servers, storage devices, and other computers), communication equipment, and power systems in a modular and flexible manner. Data center workloads demand high computational capabilities, flexibility, power efficiency, and low costs. Being able to accelerate at least some portions of large-scale software services can achieve desired throughputs and enable these data centers to meet the demands of their resource consumers. However, the increasing complexity and scalability of deep learning applications can aggravate problems with memory bandwidth.

BRIEF SUMMARY

Memory bandwidth management techniques and systems for accelerating neural network evaluations are described.

In a data center, a neural network evaluation accelerator can include a processor that supports parallel processing ("parallel processor"), such as a field programmable gate array (FPGA). This processor, which is separate from the general computer processing units (CPUs) at the data center, performs a process using a weight dataset loaded from external memory after at least two observation vectors from a same or different data streams (from the cores of the CPUs). By queuing up input data of at least two streams or at least two observation vectors before applying the weighted dataset, the memory bandwidth requirement for the neural network weight loading can be reduced by a factor of K, where K is the number of input datasets in a batch. In addition, by using a processor that supports parallel processing, N simultaneous streams can be processed in parallel lock step to ensure that the memory bandwidth requirement for N parallel streams remains the same as it is for a single stream. This enables a throughput of N*K input datasets for each loading of a weight dataset.

A service benefiting from inclusion of a deep learning architecture that is hosted at a data center can include a deep neural network (deep NN) evaluation performed on an FPGA where the method includes loading a first weight dataset from off-chip storage, queuing a batch of at least two feature vectors at an input of the FPGA, performing a first layer process of the deep NN evaluation to the batch to generate intermediates, loading a second weight dataset of the off-chip storage, and performing a second layer process of the deep NN evaluation to the intermediates. In some cases, the at least two feature vectors can be from at least two streams of data, where the at least two streams of data come from corresponding cores. In some cases, the at least two feature vectors can be from a same stream of data. In some cases, the at least two feature vectors can include at least two observation vectors from each of at least two streams of data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A-3D illustrate a comparison of bandwidth management in neural network evaluations.

DETAILED DESCRIPTION

Memory bandwidth management techniques and systems are described that can accelerate neural network evaluations.

Due to the computation pattern of many neural network evaluations, general purpose processors and pure software based solutions tend to be inefficient and, in some cases, unable to meet performance requirements for the applications that they form a part. Furthermore, these evaluations tend to be limited by the resources available at the data centers performing the computations. By including FPGAs in data centers, and leveraging these FPGAs in the manners described herein, it is possible to perform the complex deep neural network evaluations within the processor-to-memory bandwidth constraints as well as the machine-to-machine networking bandwidth constraints of current data centers. In some cases, particularly where power consumption efficiency is not a priority or fewer parallel computation streams are needed, graphics processing units (GPUs) may be used to perform the neural network evaluations.

Figure 1:
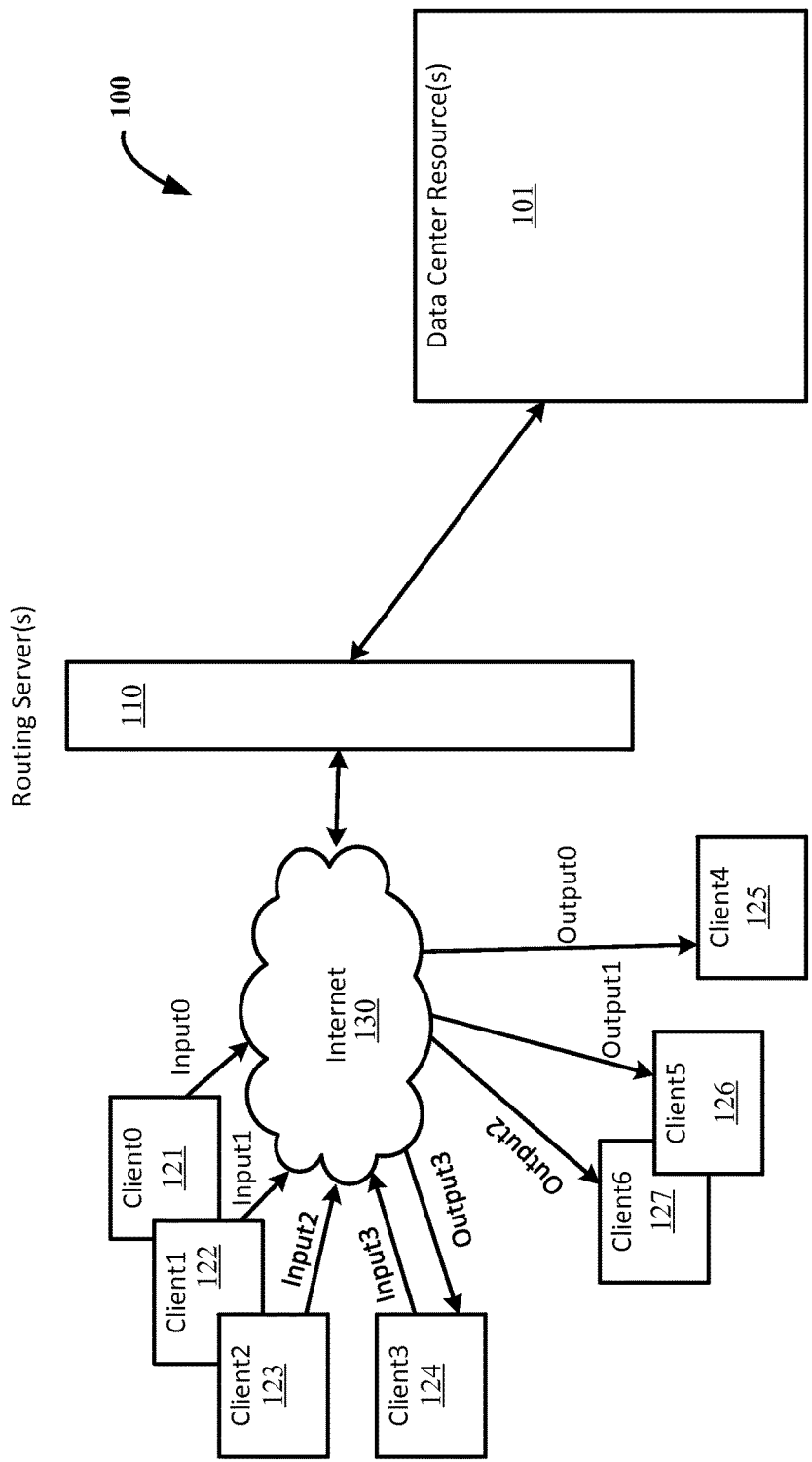
FIG. 1 illustrates an example operating environment providing memory bandwidth management for deep learning applications.

FIG. 1 illustrates an example operating environment providing memory bandwidth management for deep learning applications. Referring to FIG. 1, a data center 100 can include a number of resources 101—physical and virtual—on which applications and services can be hosted. Routing server(s) 110 can facilitate the directing of a request to the appropriate resource. One or more of the routing server(s) 110 may be physically present in a particular data center 100. The service(s) hosted at the data center 100 may service many clients such as Client0 121, Client1 122, Client2 123, Client3 124, Client4 125, Client5 126, and Client6 127, that communicate with the service(s) (and access the data center resource(s) 101) over the Internet 130.

Various implementations of the described techniques are suitable for use as part of a process for services involving computer vision, image processing/recognition, speech processing/recognition, natural language processing, audio recognition, bioinformatics, weather prediction, stock forecasting, control systems and any other application where neural networks may be applied.

As an example scenario, the operating environment supports a translation service for an audio or video call. The translation service may involve a deep learning application to recognize words from a conversation. The clients (e.g., 121, 122, 123, . . . ) can enable a user to elect to participate in the translation service so that the audio of the user's conversation can be sent to the translation service. For example, the audio from a conversation at a device running Client0 121 can be sent as Input0 to the translation service, the audio from a conversation at a device running Client1 122 can be sent as Input1 to the translation service, the audio from a conversation at a device running Client2 123 can be sent as Input2 to the translation service, and the audio from a conversation at a device running Client3 124 can be sent as Input3 to the translation service.

These independent conversations can be processed at the data center 100 and can have output sent to a same client or different client (that may or may not be participating in sending audio to the service). For example the translated conversation from Input 0 can be sent to Client4 125 as Output0, the translated conversation from Input1 can be sent to Client5 126 as Output1, the translated conversation from Input2 can be sent to Client6 127 as Output2, and the translated conversation from Input3 can be sent back to Client3 125 as Output3. Accelerating one or more of the processes associated with the translation services can help the real-time functionality of such a service. However, any acceleration—or even just actual computation—is constrained, at least in part, by the physical limitations of the systems—the data center resources 101—at the data center 100.

Figure 2:
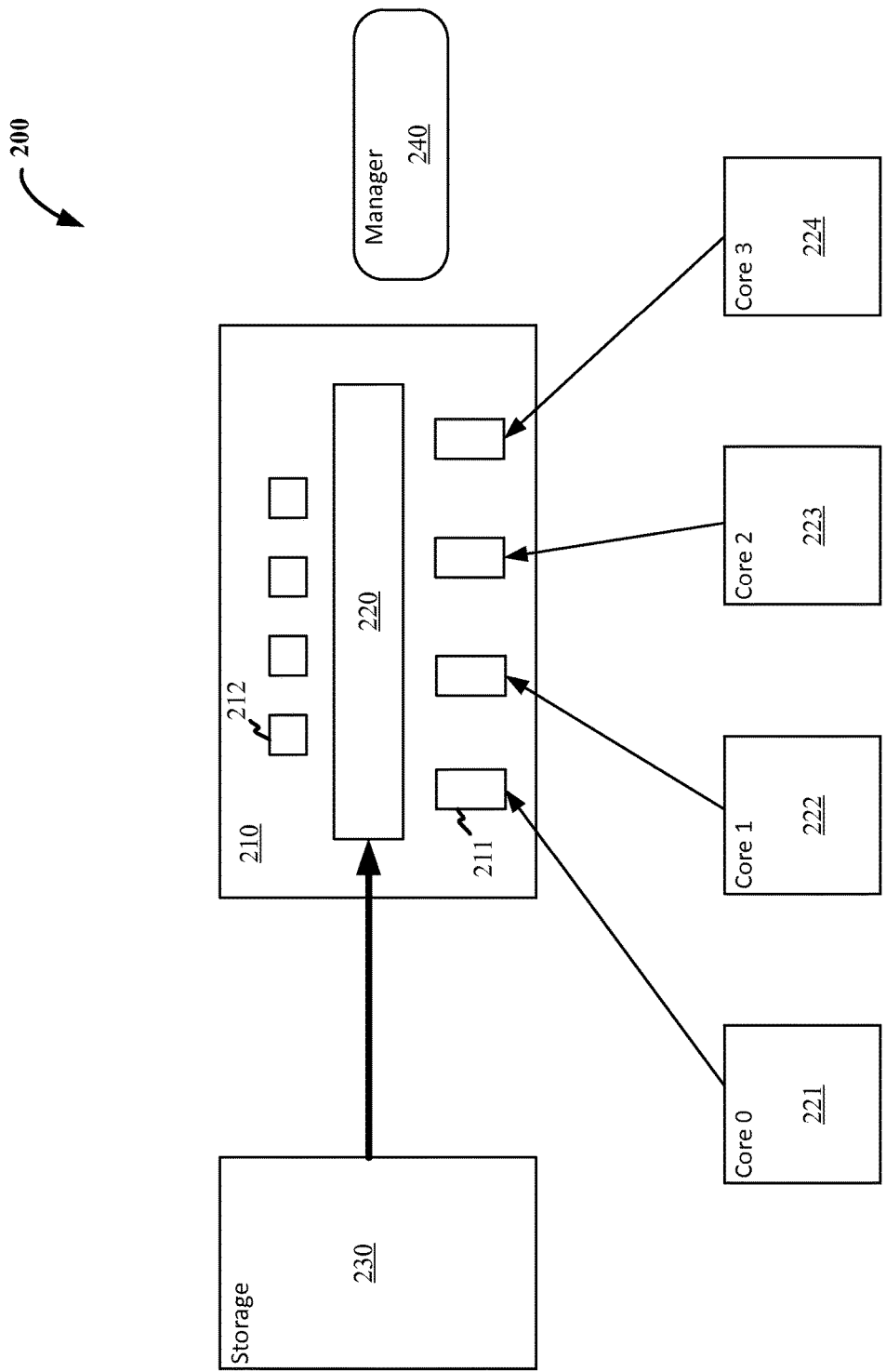
FIG. 2 illustrates an example architecture for managing and accelerating at least a component of a deep learning application hosted by resources of a data center.

FIG. 2 illustrates an example architecture for managing and accelerating at least a component of a deep learning application hosted by resources of a data center. In a data center 200 housing numerous servers, switches, and other equipment for a variety of services and applications, such as described with respect to data center 100 of FIG. 1, deep learning applications, and particularly a neural network evaluation where the weight dataset is in the megabytes (tens of megabytes, hundreds of megabytes or even more), can be accelerated and its memory bandwidth requirements reduced by batch processing of the input data.

A server at the data center 200 can include a processor with two or more cores. Each core tends to handle a single thread, or stream of data. According to certain implementations, a parallel processor 210 is used to accelerate a neural network evaluation. The parallel processor 210 can be a GPU or an FPGA as examples. The FPGA can show improved power savings over the use of a GPU. However, it should be understood that certain implementations may use the GPU or other parallel processor to perform some or all of the methods described herein.

The parallel processor 210 can include input buffers 211, which have a specified queue depth (for example of K=2 or more), and output buffers 212 for holding intermediate outputs or other data before the data is further processed and/or output to another component. In some cases, the parallel processor can include logic 220 for processing data from one or more of the input buffers 211. The logic 220 may be programmable and reconfigurable between and/or during operations depending on the type of parallel processor 210.

An "observation vector" refers to the initial dataset (or feature vector) that is input to the neural network and is used to start or trigger the recognition or classification process. These could include data representing colors, prices, sound amplitudes or any other quantifiable value that may have been observed in the subject of interest. The observation vectors input to the parallel processor 210 may be generated by a core of a CPU (discussed in more detail in the example below), by another computational unit such as an FPGA, a GPU, or other logic on the parallel processor 210 that is performing the neural network evaluation.

The "intermediate outputs" or "intermediates" refer to the internal state values of the neural network that are used to track progress of data through the network for either the current evaluation, or across multiple evaluations of the network (in the case of RNNs).

The intermediate values may correlate with features of an observation vector, but typically they represent some abstracted form of the original observation data as the network algorithm "reasons" about the inputs that it was given. Logically, intermediate values represent the network's attempt to categorize data based in a hyper dimensional decision line between competing concepts. Mathematically, intermediate values represent the nearness that the observation vector, prior intermediate values, or a combination of both, appear to the dividing line between competing concepts that one or more neural network nodes represent.

As illustrated in FIG. 2, a single parallel processor 210 can receive input data from multiple cores such as Core0 221, Core1 222, Core2 223, and Core3 224, which may be provided in one or more processing units housed in one or more servers. For example, one server may contain a processing unit with, as is common today, 12-24 cores. In some applications, the input data from these cores may be loaded into corresponding ones of the input buffers 211. In other applications, input data from one of these cores may be loaded into more than one input buffer.

In another implementation, instead of many separate queues (provided by the input buffers 211), one for each of the N cores, the parallel processor can have a single queue where the different cores add their datasets to that single queue as they become available. The parallel processor could periodically poll that queue (after each complete evaluation of the deep NN) and read a new batch of datasets from the queue for parallel processing. The new batch of datasets would be processed through the deep NN in parallel and then a decoder process, either on the parallel processor or on one of the CPU cores, would send them back to the appropriate core. Each dataset would be tagged by the core that sent it to facilitate this de-multiplexing operation. This type of implementation is suitable for cases where the parallel processor such as the FPGA can handle the computational load such as the addition of the decoding process.

As mentioned above, the observation vectors may be generated by the cores and provided directly as the input data to the parallel processor 210; however, in some cases, the observation vectors may not be output by the cores. In some of those cases, the parallel processor 210 may generate the observation vectors (using separate logic to do so) or other computational units may be generating the observation vectors from data output from the cores or in systems fully implemented using other computational units. Thus when a core and data stream is described herein, the use of other computational units can be considered as other implementations that may be suitable as the processing unit for a particular recognition process (or other application that benefits from deep learning).

When the parallel processor performs a weighted function for the neural network evaluation, the weight dataset is generally too large to be stored on-chip with the processor. Instead, the weight dataset is stored in off-chip storage 230 and loaded, in partitions small enough for on-chip storage, onto the parallel processor 210 each time the particular weighted function is carried out. For maximum efficiency, weights must be loaded at the speed the processor can consume them, which requires a significant amount of memory bandwidth. Off-chip storage 230 may include memory modules (e.g., DDR, SDRAM DIMMs), hard drives (solid state, hard disk, magnetic, optical, etc.), CDs, DVDs, and other removable storage devices. It should be understood that the storage 230 does not consist of propagating signals.

According to various techniques described herein, the memory bandwidth is managed by processing parallel streams of data (e.g., from the cores Core0 221, Core1 222, Core2 223, and Core3 224) in batches at the parallel processor 210 so at least two feature vectors are processed for each layer's set of weight data input to the parallel processor 210 from the off-chip storage 230. Although the described techniques can be useful for two feature vectors (from a same or different stream of data), when at least four feature vectors are processed in parallel, a noticeable effect on bandwidth and/or power efficiency can be seen. For example, doubling the number of items processed in parallel will roughly halve the memory bandwidth.

In some cases, acceleration of deep NN evaluation can be managed by a manager agent 240. The manager agent 240 can be implemented in software executable by any suitable computing system, including physical servers and virtual servers, and any combination thereof. The manager agent 240 may be installed on and run in the context of a virtual machine in some scenarios or may be directly installed and executed on a computing system in a non-virtualized implementation. In some cases, the manager agent 240 may be implemented in whole or in part in hardware.

The manager agent 240, when used, can coordinate the timing of communicating data between various components at the data center, for example, between the off-chip storage 230 that stores weights for the deep NN evaluation and the parallel processor 210. Accordingly, in certain embodiments, the manager agent 240 and/or the bus/data routing configuration for the data center 200 enables datasets (e.g., from the cores Core0 221, Core1 222, Core2 223, Core3 224) to be communicated to a single parallel processor 230 for processing in batches.

FIGS. 3A-3D illustrate a comparison of bandwidth management in neural network evaluations. In the scenario illustrated in FIG. 3A, the deep NN evaluation involves a software or hardware evaluation and does not include the acceleration or memory management as described herein. Instead, the weight datasets stored in the external memory 300 are applied separately to each dataset (e.g., from the cores Core0 301 and Core1 302) during the corresponding deep NN evaluations (e.g., DNN evaluation(0) 303 and DNN evaluation(1) 304, respectively). In particular, a first layer weight set 310 from external memory 300 and a first feature vector Vector0 311 from a first stream Stream0 from Core0 301 are retrieved/received (312) for the DNN evaluation(0) 303; and a first layer process is performed (313), generating intermediates 314.

A second layer weight set 315 from the external memory 300 is then retrieved/received 316 in order to perform the second layer process (317) on the intermediates 314. This evaluation process, where the weights are retrieved/received from external memory 300, continues for each layer until the entire process is completed for a particular input vector. The process can repeat for each input feature vector (e.g., Vector01 of Vector0). If there are multiple cores running the deep NN evaluations, then multiple deep NN evaluations could be performed in parallel, but, the without memory management as described herein, each evaluation requires retrieving/receiving the weight dataset from external memory 300 as an independent request, and use of an additional processor/core.

For example, the first layer weight set 310 from external memory 300 and a second feature vector Vector1 318 from a second stream Stream1 from Core1 302 are retrieved/received (319) for the DNN evaluation(0) 304; and a first layer process is performed (313) to generate intermediates 320 for the second stream. The second layer weight set 315 from the external memory 300 is then retrieved/received 316 in order to perform the second layer process (317) on the intermediates 320. As with the DNN evaluation(0) 303, the DNN Evaluation(1) 304 continues for each layer until the entire process is completed for a particular input feature vector, and repeated for each input feature vector (e.g., Vector11 of Stream1). As can be seen, this is not an efficient mechanism for performing the deep NN evaluations and requires considerable memory bandwidth to perform since each evaluation requires a retrieval of the weighted datasets and its own processor/core(s) to perform the evaluation.

In the scenario illustrated in FIG. 3B, a memory managed, accelerated deep NN process is using an FPGA 330 to perform the deep NN evaluation on two feature vectors from a same stream of data. Here, two feature vectors, observation vectors Vector0 and Vector01 331 can be loaded onto the FPGA 330 from Core0 301 and evaluated as a batch. The first layer weight set 310 can be received/retrieved for loading (332) on the FPGA 330 and the first layer process performed (333) at the FPGA 330 on both Vector0 and Vector01 331. Intermediates 334 from the first layer process can be available when the first layer process is complete for both observation vectors; and the second layer weight set 315 loaded (335) onto the FGPA 330.

The intermediates 334 can be loaded into a buffer (such as input buffer 211 of FIG. 2) for the next layer of processing and the second layer process performed (337). The deep NN evaluation continues at the FPGA 330 for each layer until the entire process is completed for the two observation vectors Vector0 and Vector01 331. This process can then be repeated for the next pair of observation vectors (e.g., Vector02 and Vector03). It should be understood that although only two feature vectors are described, more than two feature vectors/observation vectors can be evaluated in parallel using the FPGA. This will further reduce the required memory bandwidth, but will find its limit in the latency of buffering the batch from the single stream of data, because in real-time applications, buffering N observation vectors before commencing computation causes the system's output to be delayed by N vectors, and in some applications, acceptable delays are not large enough to allow efficient operation of the parallel processor. Further, batching of vectors from a same stream is not applicable to recurrent networks (RNNs) because there, the vectors within a batch are not independent (computation at time step t requires the output of time step t-1).

Figure 3C:
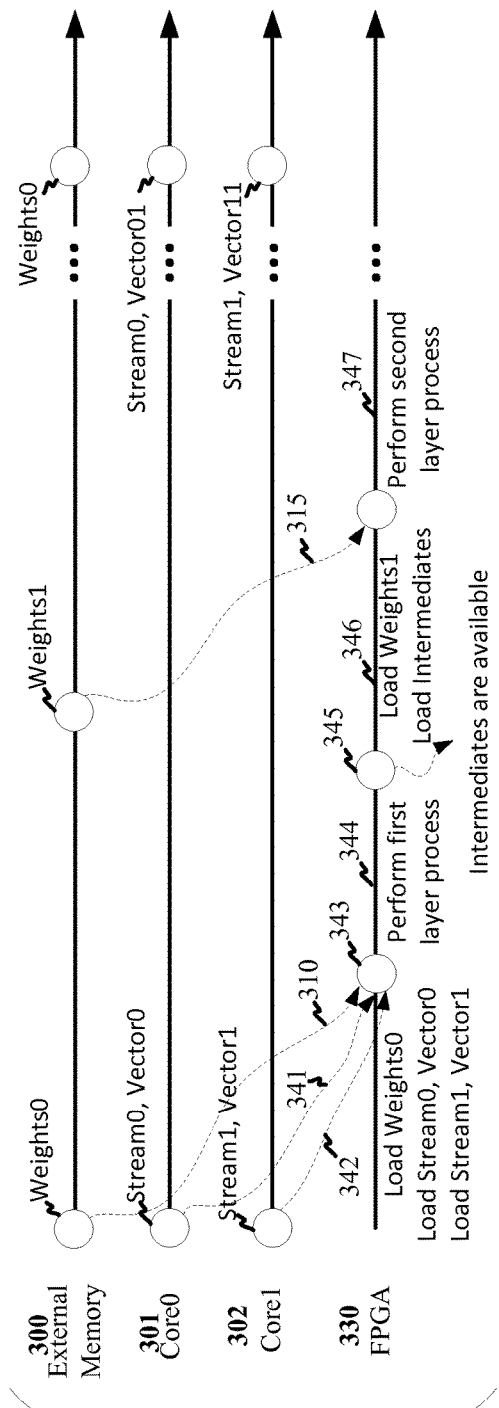

In the scenario illustrated in FIG. 3C, a memory managed, accelerated deep NN process using the FPGA 330 entails performing the DNN evaluation on two feature vectors from two different streams of data. That is, two feature vectors, one observation vector Vector0 341 from Core0 301 and one observation vector Vector1 342 from Core1 302 are evaluated as a batch. The first layer weight set 310 can be received/retrieved for loading (343) on the FPGA 330 and the first layer process performed (344) at the FPGA 330 on both Vector0 341 and Vector1 342, generating intermediates 345. The intermediates 345 (the data output of the first layer process) can be loaded into a buffer for the next layer of processing. Unlike the scenario illustrated in FIG. 3B, which is suitable for evaluating a DNN for MLPs but not suitable for evaluating the deep NN of a RNN, this scenario is suitable for evaluating a RNN (recurrent neural network) because all observations within the batch are from different streams and thus independent.

After the first layer process is complete for both observation vectors 341, 342, the second layer weight set 315 is loaded (346) onto the FGPA 330 and the second layer process performed (347). The deep NN evaluation continues at the FPGA 330 for each layer until the entire process is completed for the two observation vectors Vector0 341 and Vector1 342. This process can then be repeated for the next observation vectors for these two streams (e.g., Vector01 and Vector11). Of course, although only two streams and cores are shown for simplicity, more than two can be evaluated in parallel at the FPGA 330.

Figure 3D:
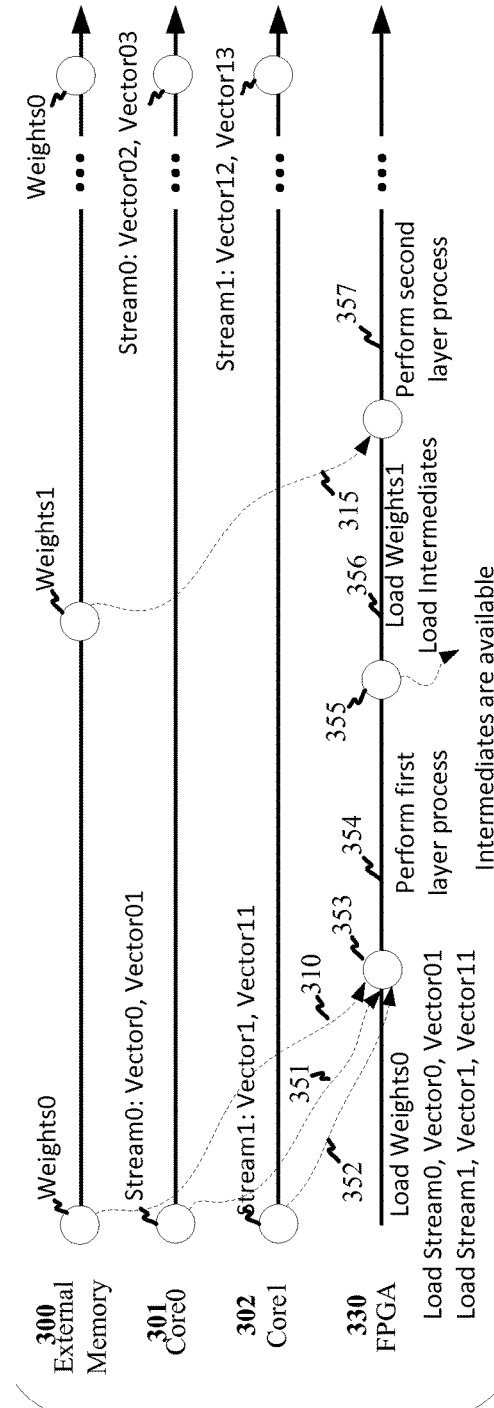

In the scenario illustrated in FIG. 3D, a memory managed, accelerated deep NN process using the FPGA 330 entails performing the deep NN evaluation on four feature vectors—two feature vectors (observation vectors) each from two streams of data. That is, two observation vectors 351 (Vector0, Vector01) from Core0 301 and two observation vectors 352 (Vector1, Vector11) from Core1 302 are loaded and evaluated as a batch. The two observation vectors from each stream can be loaded by having a queue depth of two for the input buffers of the FPGA (see e.g., input buffers 211 FIG. 2). Accordingly, with a single loading (353) of the first layer set of weights 310, the two observation vectors 351 (Vector0, Vector01) from Core0 301 and the two observation vectors 352 (Vector1, Vector11) from Core1 302, the first layer process can be performed (354). As described above with respect to the scenario illustrated in FIG. 3B, although this scenario is suitable for various deep NN architectures evaluations, it is not as suitable to RNNs due to the dependent nature of the vectors in a batch as described with respect to FIG. 3C.

The intermediates 355 (the data output of the first layer process) can be loaded into a buffer for the next layer of processing, the second layer weight set 315 can be retrieved/received for loading (356) onto the FPGA 330 and then the second layer process performed (357). The DNN evaluation continues at the FPGA 330 for each layer until the entire process is completed for at least the four observation vectors Vector0, Vector01, Vector1, and Vector11. This process can then be repeated for the next pair of observation vectors for these two streams (e.g., Vector02, Vector03 and Vector12, Vector13). Of course, this scenario is also scalable to additional cores being handled in parallel by the FPGA 330.

As can be seen from the illustrated scenarios, the configurations shown in FIGS. 3B and 3C reduce the memory bandwidth needed to evaluate the same amount of data as the configuration shown in FIG. 3A. In addition, the configuration shown in FIG. 3D can even further reduce the necessary memory bandwidth. For the configurations shown in FIGS. 3B and 3D, there is a latency cost for the time to queue the multiple observation vectors from a single data stream. In addition, there may further be some latency cost for evaluating twice (or more) the amount of data through each line of the available parallel processes.

Accordingly, the input data of at least two streams and/or at least two observation vectors can be queued for processing at an FPGA to reduce the memory bandwidth requirement for neural network weight loading by a factor of K, where K is the number of input datasets in a batch (and can also be considered the queue depth for the FPGA). For optimum bandwidth efficiency, processing occurs when a batch of K input datasets are accumulated in the on-chip FPGA memory. By queueing the inputs in this manner, any I/O bound problem where the bandwidth of the database (weights) required for processing the input dataset is prohibitive can be handled. Thus, in general, for a required bandwidth B, the average effective bandwidth needed using the queuing method is B/K. N simultaneous streams can be processed in parallel lock step to ensure that the memory bandwidth requirement for N parallel streams remains the same as it is for a single stream.

Example Scenario—Internet Translator

For an Internet translator, conversations may arrive at the data center after being input via a microphone at a client and be transformed (e.g., via a Fast Fourier Transform) to establish power bands based on frequency (from which the observation vectors can be obtained). The deep NN evaluation for the example scenario involves a DNN (for MPL) performing eight layers of matrix multiplication, adding a bias vector and, for all but the top layer, applying a non-linearity function. The output of the DNN evaluations can establish probability scores, indicating what the probability that the slice being looked at belongs to a unit of speech, for example that the slice being looked at belongs to a middle part of an "ah" pronounced in left context of "t" and right context of "sh". Additional processing tasks performed by the processor cores can involve identifying the words based on the probability scores and applying against certain dictionaries to perform a translation between languages.

Figure 4:
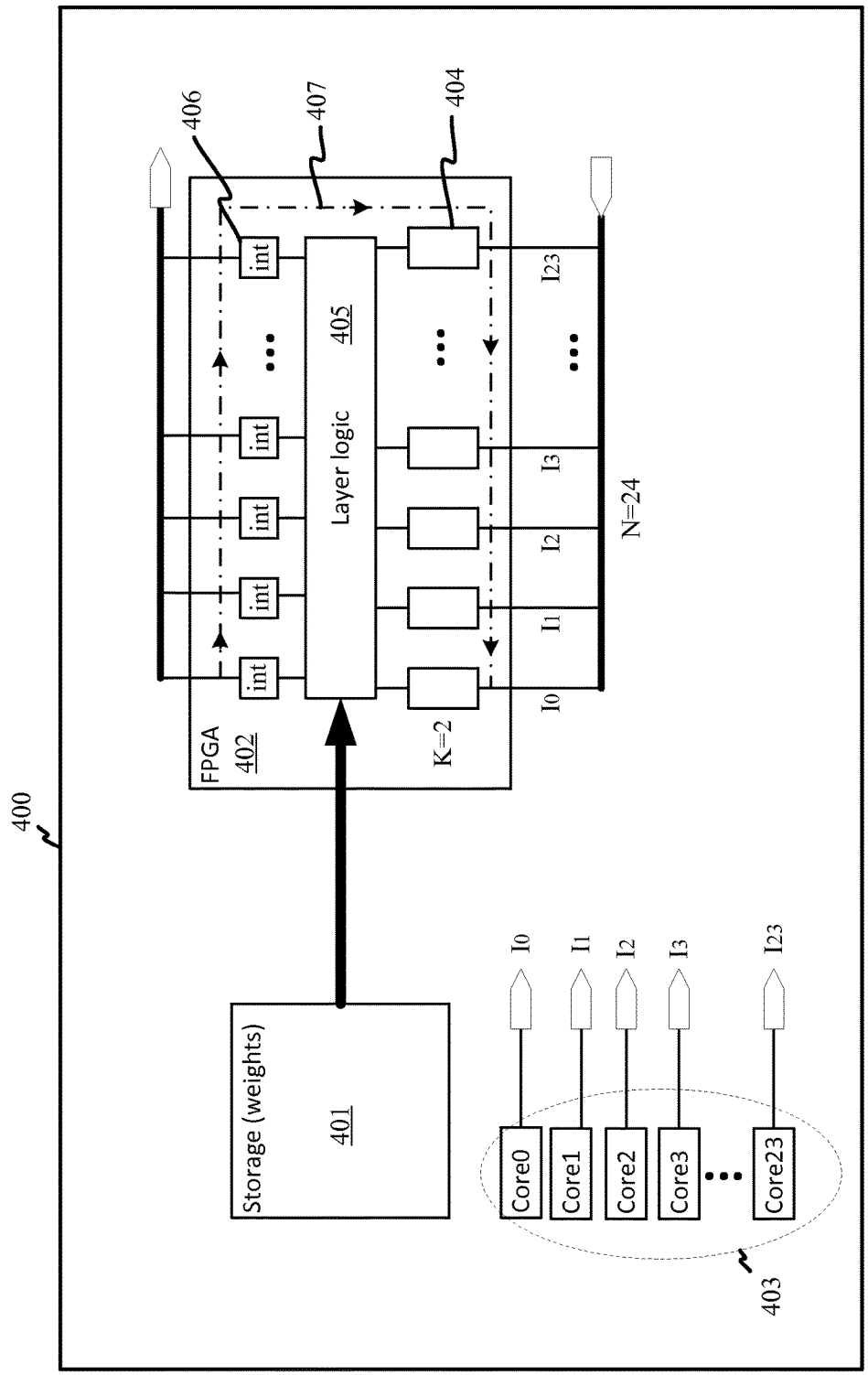
FIG. 4 illustrates an example implementation of accelerating a DNN process using an FPGA.

FIG. 4 illustrates an example implementation of accelerating a deep NN process using an FPGA. Referring to FIG. 4, a server blade 400 at a data center can include external storage 401 storing the weight datasets. Advantageously, a single FPGA 402 may be capable of performing all of the deep NN evaluation for an entire server blade containing 24 CPU cores 403 (N=24); leaving those cores 403 to handle the other processing tasks required for 24 simultaneous conversations while the deep NN evaluation is being carried out.

In the example scenario, input datasets from each of the 24 cores can be loaded on to the input buffers 404 having a queue depth of K=2. That way two observation vectors from each conversation/core's data stream can undergo processing through the layer logic 405, for example a matrix multiply (such as for deep MLP) or multiple parallel matrix multiplies and non-linearity's (such as for LSTM RNN), as a single batch. The intermediates 406 from a layer of the layer logic 405 can be routed back (407) to undergo another process with a new weighted function when a new weight data set is loaded from the storage 401. This process can be repeated until all the layers have been processed, at which time the output is then sent back to the processing cores, which may demultiplex (demux) the data at some point.

Live translation of speech requires careful attention to latency, power, and accuracy. FPGAs typically have relatively low power requirements (10 W) and yet can still deliver high compute performance. Since using only CPU cores (a pure software approach) for performing speech recognition using a deep NN evaluation typically requires at least 3 CPU cores per conversation, where at least two are consumed for deep NN evaluation, the FPGA 402 is able to effectively remove the need for 2*24=48 CPU cores, which translates to high power savings. For example, assuming a bloated estimate of 25W for FPGA power consumption, and a reasonable average power consumption for a CPU core of 100 W/12=8.33 W, the net power savings would be on the order of 48*8.33 W−25 W=375 W per server blade. Calculated another way, without an FPGA, the power use would be 3*8.33 W=25 W per conversation, while with the FPGA the power per conversation would be 8.33 W+25 W/24 =9.37 W.

When scaled to large numbers of users, the ~3× increase in compute power needed by the pure software deep NN approach as opposed to just using a single CPU core for a conversation (and a single FPGA for easily 24 conversations) makes a pure software approach cost prohibitive, even though deep NNs provide greater recognition accuracy and hence a better user experience when incorporated in speech recognition and translation services. Therefore, the inclusion of the FPGA 402 enables deep NNs to be incorporated into speech recognition and translation services.

Usually, performing the deep NN evaluation on the FPGA would entail a very high bandwidth requirement. One of the primary difficulties with the FPGA implementation is the management of memory bandwidth. For one exemplary Internet translator, there are approximately 50 million 16-bit neural network weights that must be processed for each complete evaluation of the neural network. For every evaluation of the neural network, the FPGA must load 50 M*2 bytes=100 M bytes of data from memory. In order to meet performance specifications, the neural network must be evaluated 100 times per second; per conversation. For even one conversation, this means that the memory bandwidth requirement for the FPGA is 100*100 MB=10 GB/Sec. The absolute peak memory bandwidth of the typical FPGA memory interface is about 12.8 GB/Sec, but this is rarely achieved and assumes perfect operating conditions with no other activity being present in the system. If one considers that the task of the FPGA is to process N=24 such conversations simultaneously, the problem appears intractable. However, the techniques illustrated in FIGS. 3B-3D (and reflected in FIG. 4 for the specific implementation of N=24) can address this problem.

First considering the single conversation case, which can be considered illustrated in FIG. 3B, the memory bandwidth requirement may be lowered by batching the input data in groups of K input datasets (of observation vectors). By delaying processing until K input datasets have been accumulated, and then loading the neural network weight data once for all K inputs, the effective memory bandwidth required goes down by a factor of K (while delaying speech recognition output by the duration corresponding to K−1 vectors, for example (K−1)*10 ms). For example, if the memory bandwidth requirement is 10 GB/Sec, and K=2, the effective memory bandwidth required is 10 GB/Sec/2=5 GB/Sec, which is a much more manageable figure. Greater values of K result in lower effective memory bandwidth and can be chosen to reduce the memory bandwidth requirement to a manageable number for the application. This comes at the cost of added computational latency, as input datasets are delayed until K have been accumulated, but since maintaining throughput can be more important than latency in certain situations, it is a good tradeoff in those certain situations.

In the case of processing N simultaneous conversations, such as illustrated in FIGS. 3C and 3D with N=2 and K=1 and K=2 respectively, each conversation uses a queue of K input datasets and N such queues in use simultaneously (N=24 and K=2 for the example illustrated in FIG. 4). The input datasets may be scheduled so that all N queues are processed in lock step, using exactly the same weights simultaneously across all queues during a layer of the layer logic 405 (such as a matrix multiply or other weighted processing step, which can be carried out on intermediates 406 that are then re-queued 407 for the next layer processing with new weights). Thus, the neural network weight data is only loaded a single time for all N conversations (for each layer of the process), and the memory bandwidth requirement for the FPGA remains the same as if only a single conversation were being processed.

Figure 5:
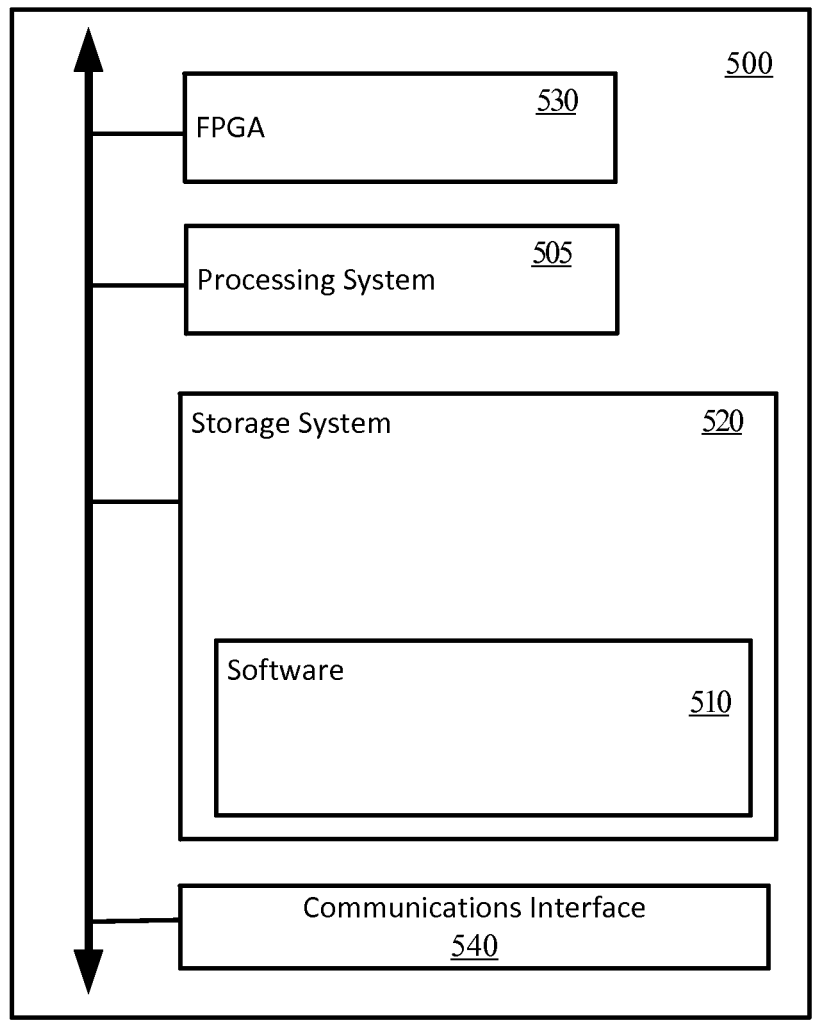
FIG. 5 illustrates an example computing system on which the described techniques may be carried out.

FIG. 5 is a block diagram illustrating components of a computing device or system that may be used to carry out some of the processes described herein. Referring to FIG. 5, system 500 can include one or more blade server devices, standalone server devices, personal computers, routers, hubs, switches, bridges, firewall devices, intrusion detection devices, mainframe computers, network-attached storage devices, and other types of computing devices. The hardware can be configured according to any suitable computer architectures such as a Symmetric Multi-Processing (SMP) architecture or a Non-Uniform Memory Access (NUMA) architecture. Accordingly, more or fewer elements described with respect to system 500 may be incorporated to implement a particular computing system.

The system 500 can include a processing system 505, which may include one or more processing devices such as a central processing unit (CPU) with one or more CPU cores, a microprocessor or other circuitry that retrieves and executes software 510 from storage system 520. Processing system 505 may be implemented within a single processing device but may also be distributed across multiple processing devices or sub-systems that cooperate in executing program instructions.

The one or more processing devices of processing system 505 may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 520 may comprise any computer readable storage media readable by processing system 505 and capable of storing software 510 including instructions for performing various processes in which the neural network evaluation performed on an FPGA forms a part. Software 510 may also include additional processes, programs, or components, such as operating system software, database management software, or other application software. Software 510 may also include firmware or some other form of machine-readable processing instructions executable by processing system 505. In addition to storing software 510, storage system 520 may store matrix weights and other datasets used to perform neural network evaluations. In some cases, the manager agent 240 is stored, at least in part, on a computer-readable storage medium forming part of the storage system 520 and implementing virtual and/or non-virtual memory.

Storage system 520 may include volatile and nonvolatile, removable and non-removable media implemented in any method or technology for storage of information, such as computer readable instructions, data structures, program modules, or other data.

Although storage system 520 is shown as one block, storage system 520 represents the on-chip and external storage available to computing system 500. Storage system 520 can include various storage media such as random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal or carrier wave. In addition to storage media, in some implementations, storage system 520 may also include communication media over which software and data may be communicated internally or externally.

Storage system 520 may be implemented as a single storage device but may also be implemented across multiple storage devices or sub-systems co-located or distributed relative to each other. In some cases, the processing system 505 can access the storage system 520 (or parts of the storage system 520) by system bus. Storage system 520 may include additional elements, such as a controller, capable of communicating with processing system 505.

Computing system 500 further includes an FPGA 530 for performing neural network evaluations. Multiple FPGAs may be available in a data center. In some cases, a plurality of FPGAs can be incorporated into a daughter card and housed with a subset of the servers. Alternatively, a single FPGA may be housed in a single server, where services requiring more than one FPGA can be mapped across FPGAs residing in multiple servers and/or services requiring more than one server can access a single FPGA residing at one of the servers. In some cases, one or more FPGAs may be housed separately from the servers. When incorporated in a same server, the FPGA(s) may be coupled to the processing system 505 on a same board or on separate boards interfaced with a communications interface technology such as PCIe (PCI express).

A communication interface 540 is included, providing communication connections and devices that allow for communication between device 500 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 500 may be included in a system-on-a-chip (SoC) device. These elements may include, but are not limited to, the processing system 505, elements of the storage system 520, and even elements of the communications interface 540.

Certain aspects of the invention provide the following non-limiting embodiments:

Example 1. A method of performing neural network processes, the method comprising: receiving, at a field programmable gate array (FPGA), a batch of input data for accelerated processing of a neural network evaluation, wherein the batch of input data comprises at least two feature vectors; loading the FPGA with a first layer set of weights for the neural network evaluation from an external memory; and applying, within the FPGA, the first layer set of weights to the batch of the input data to generate intermediates.

Example 2. The method of example 1, wherein the at least two feature vectors comprise one observation vector from each of at least two data streams.

Example 3. The method of example 2, wherein the neural network evaluation is a recurrent neural network evaluation.

Example 4. The method of example 1, wherein the at least two feature vectors comprise at least two observation vectors from each of at least two data streams.

Example 5. The method of example 1, wherein the at least two feature vectors comprise at least two observation vectors from a single data stream.

Example 6. The method of any of examples 1-5, further comprising: after applying the first layer set of weights to the batch, loading the FPGA with a second layer set of weights for the neural network evaluation from the external memory; and applying, within the FPGA, the second layer set of weights to the intermediates.

Example 7. The method of any of examples 1, 2, or 4-6, wherein the neural network evaluation is a deep neural network multi-layer perceptron evaluation.

Example 8. The method of any of examples 1-7, wherein the batch of input data is received from at least one core.

Example 9. The method of any of examples 1-7, wherein the batch of input data is received from other logic on the FPGA.

Example 10. The method of any of examples 1-7, wherein the batch of input data is received from other processing units.

Example 11. One or more computer readable storage media having instructions stored thereon that when executed by a processing system, direct the processing system to manage memory bandwidth for deep learning applications by: directing a batch of at least two observation vectors from at least one core to queue up at a field programmable gate array (FPGA); loading at least one weighted dataset on the FPGA, each of the at least one weighted dataset being loaded once per batch of the at least two observation vectors directed to queue up at the FPGA; and directing an evaluation output from the FPGA to the at least one core for further processing.

Example 12. The media of example 11, wherein the instructions that direct the batch of the at least two observation vectors from at least one core to queue up at the FPGA direct one observation vector from each of at least two cores to queue up at the FPGA.

Example 13. The media of example 11, wherein the instructions that direct the batch of the at least two observation vectors from at least one core to queue up at the FPGA direct at least two observation vectors from each of at least two cores to queue up at the FPGA.

Example 14. A system comprising: one or more storage media; a plurality of processing cores; a service, the service being stored on at least one of the one or more storage media and executed on at least the plurality of processing cores; a parallel processor in communication with the plurality of cores to perform a neural network evaluation on a batch of data for a process of the service; and weight datasets for the neural network evaluation stored on at least one of the one or more storage media.

Example 15. The system of example 14, wherein the parallel processor is a field programmable gate array (FPGA).

Example 16. The system of example 14 or 15, wherein the parallel processor receives one observation vector from each core of the plurality of cores as the batch of data.

Example 17. The system of example 16, wherein the neural network evaluation comprises a recurrent neural network evaluation.

Example 18. The system of any of examples 14-16, wherein the neural network evaluation comprises a deep neural network multi-layer perceptron evaluation.

Example 19. The system of any of examples 14, 15, or 18, wherein the parallel processor receives at least two observation vectors from each core of the plurality of cores as the batch of data.

Example 20. The system of any of examples 14-19, wherein the service comprises a speech recognition service.

Example 21. The system of any of examples 14-20, further comprising: a manager agent stored, at least in part, on at least one of the one or more storage media, that when executed, directs the system to: direct the batch of data from at least one of the plurality of processing cores to queue up at the parallel processor; load at least one weighted dataset of the weight datasets onto the parallel processor, each of the at least one weighted dataset being loaded once per batch; and direct an evaluation output from the parallel processor to the plurality of processing cores.

Example 22. The system of example 21, wherein the manager agent directs the system to direct the batch of data to queue up at the parallel processor by directing at least one observation vector from of each of at least two cores of the plurality of cores to the parallel processor.

Example 23. The system of example 21, wherein the manager agent directs the system to direct the batch of data to queue up at the parallel processor by directing at least two observation vectors from of each of at least two cores of the plurality of cores to the parallel processor.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of performing neural network processes, the method comprising:
   receiving, at a set of N input buffers, a batch of input data for accelerated processing of a neural network evaluation, wherein each input buffer provides a queue with a queue depth of at least two, where N is a number of available parallel streams of a field programmable gate array (FPGA), wherein the batch of input data comprises at least two observation vectors, one of the at least two observation vectors being loaded at a first position in the queue of the set of N input buffers and a second of the at least two observation vectors being loaded at a second position in the queue of the set of N input buffers;
   loading the FPGA with a first layer set of weights for the neural network evaluation from an external memory; and
   applying, within the FPGA, the first layer set of weights to the batch of the input data to generate intermediates, wherein while the one of the observation vectors is being processed, the second of the observation vectors moves from the second position to the first position in the queue of the input buffers and the intermediates generated from the one of the observation vectors at the first position in the queue are re-queued for next layer processing; and wherein after the second of the at least two feature vectors is processed, the intermediates generated from the second of the observation vectors are re-queued for the next layer processing.

2. The method of claim 1, wherein the at least two observation vectors comprise one observation vector from each of at least two data streams.

3. The method of claim 2, wherein the neural network evaluation is a recurrent neural network evaluation.

4. The method of claim 1, wherein the at least two observation vectors comprise at least two observation vectors from each of at least two data streams.

5. The method of claim 1, wherein the at least two observation vectors comprise at least two observation vectors from a single data stream.

6. The method of claim 1, further comprising:
   after applying the first layer set of weights to the batch, loading the FPGA with a second layer set of weights for the neural network evaluation from the external memory; and
   applying, within the FPGA, the second layer set of weights to the intermediates.

7. The method of claim 1, wherein the neural network evaluation is a deep neural network multi-layer perceptron evaluation.

8. One or more computer readable storage media having instructions stored thereon that when executed by a processing system, direct the processing system to manage memory bandwidth for deep learning applications by:
   directing a batch of at least two observation vectors from at least one core to queue up in a set of N input buffers at a field programmable gate array (FPGA), wherein each input buffer provides a queue with a queue depth of at least two, where N is a number of available parallel streams of the FPGA;
   loading at least one weighted dataset on the FPGA, each of the at least one weighted dataset being loaded once per batch of the at least two observation vectors directed to queue up at the FPGA, the batch of the at least two observation vectors being processed by the FPGA with intermediates re-queued in the input buffers until all observation vectors in the queue are processed by the FPGA for a particular weighted dataset of the at least one; and
   directing an evaluation output from the FPGA to the at least one core for further processing.

9. The media of claim 8, wherein the instructions that direct the batch of the at least two observation vectors from at least one core to queue up at the FPGA direct one observation vector from each of at least two cores to queue up at the FPGA.

10. The media of claim 8, wherein the instructions that direct the batch of the at least two observation vectors from at least one core to queue up at the FPGA direct at least two observation vectors from each of at least two cores to queue up at the FPGA.

11. A system comprising:
one or more storage media;
a plurality of processing cores;
a service, the service being stored on at least one of the one or more storage media and executed on at least the plurality of processing cores;
a parallel processor in communication with the plurality of cores to perform a neural network evaluation on a batch of data for a process of the service;
a set of N input buffers for the parallel processor, wherein each input buffer provides a queue with a queue depth of at least two, where N is a number of available parallel streams of the parallel processor, the queue storing the batch of data for the process of the service and requeuing intermediates generated for a particular weight dataset; and
weight datasets, including the particular weight dataset, for the neural network evaluation stored on at least one of the one or more storage media.

12. The system of claim 11, wherein the parallel processor is a field programmable gate array (FPGA).

13. The system of claim 11, wherein the parallel processor receives one observation vector from each core of the plurality of cores as the batch of data.

14. The system of claim 13, wherein the neural network evaluation comprises a recurrent neural network evaluation.

15. The system of claim 11, wherein the neural network evaluation comprises a deep neural network multi-layer perceptron evaluation.

16. The system of claim 11, wherein the parallel processor receives at least two observation vectors from each core of the plurality of cores as the batch of data.

17. The system of claim 11, wherein the service comprises a speech recognition service.

18. The system of claim 11, further comprising:
a manager agent stored, at least in part, on at least one of the one or more storage media, that when executed, directs the system to:
direct the batch of data from at least one of the plurality of processing cores to queue up at the set of N input buffers for the parallel processor;
load at least one weighted dataset of the weight datasets onto the parallel processor, each of the at least one weighted dataset being loaded once per batch; and
direct an evaluation output from the parallel processor to the plurality of processing cores.

19. The system of claim 18, wherein the manager agent directs the system to direct the batch of data to queue up at the set of N input buffers for the parallel processor by directing at least one observation vector from of each of at least two cores of the plurality of cores to the parallel processor.

20. The system of claim 18, wherein the manager agent directs the system to direct the batch of data to queue up at the set of N input buffers for the parallel processor by directing at least two observation vectors from of each of at least two cores of the plurality of cores to the parallel processor.

* * * * *